United States Patent [19]
Beigbeder et al.

[11] Patent Number: 5,204,619
[45] Date of Patent: Apr. 20, 1993

[54] DEVICE FOR MEASURING ROTATIONAL SPEED USING AN OPTICAL FIBER SENSOR

[75] Inventors: Gérard Beigbeder; Vincent Michoud, both of Paris, France

[73] Assignee: Sextant Avionique, Meudon La Foret, France

[21] Appl. No.: 801,910

[22] Filed: Dec. 3, 1991

[30] Foreign Application Priority Data

Dec. 4, 1990 [FR] France .................. 90 15162

[51] Int. Cl.$^5$ .................. G01P 3/486; G01P 3/488
[52] U.S. Cl. .................. 324/174; 324/175;
324/262; 324/244.1; 250/231.14; 250/227.17
[58] Field of Search .............. 324/166, 174, 175, 173,
324/96, 207.13, 207.14, 225, 226, 244.1,
260–262; 250/231.14, 227.17; 350/374–378

[56] References Cited

U.S. PATENT DOCUMENTS

| | | | |
|---|---|---|---|
| 3,942,112 | 3/1976 | Westbrook | 324/175 X |
| 4,356,448 | 10/1982 | Brogårdh et al. | 324/244.1 |
| 4,442,350 | 4/1984 | Rashleigh | 324/244.1 X |
| 4,450,406 | 5/1984 | Bobb | 324/244.1 X |
| 4,564,289 | 1/1986 | Spillman, Jr. | 324/244.1 X |
| 4,687,993 | 8/1987 | Mermelstein | 250/227.17 X |
| 4,746,791 | 5/1988 | Forkel | 324/207.13 X |
| 4,830,449 | 5/1989 | Spillman, Jr. | 250/227.17 X |
| 4,843,232 | 6/1989 | Emo et al. | 324/175 X |
| 4,931,634 | 6/1990 | Toyama | 324/207.13 X |
| 4,931,635 | 6/1990 | Toyama | 324/207.13 X |
| 4,947,035 | 8/1990 | Zook et al. | 250/225 |
| 5,034,679 | 7/1991 | Henderson et al. | 324/244.1 |
| 5,038,102 | 8/1991 | Glasheen | 324/175 |
| 5,059,783 | 10/1991 | Sranjord et al. | 324/207.13 |

FOREIGN PATENT DOCUMENTS 2655326 6/1991 France .

OTHER PUBLICATIONS

Patent Abstracts of Japan, vol. 8, No. 48 (P-258) (1485), Dota et al., 3 Mar. 1984.

*Primary Examiner*—Gerard R. Strecker
*Assistant Examiner*—Warren S. Edmonds
*Attorney, Agent, or Firm*—Pollock, VandeSande & Priddy

[57] ABSTRACT

A device for measuring the rotational speed of a shaft. A toothed wheel is connected to rotate with the shaft within a magnetic field. A birefringement optic fiber is connected to a light source, and passes through the magnetic field. A magnetorestrictive material is supported in contact with the optical fiber and produces stress on the optical fiber in response to magnetic flux variations. Light emerging from the optical fiber is analyzed with respect to its change in phase to determine the periodic variation in the magnetic field caused by the toothed wheel.

26 Claims, 4 Drawing Sheets

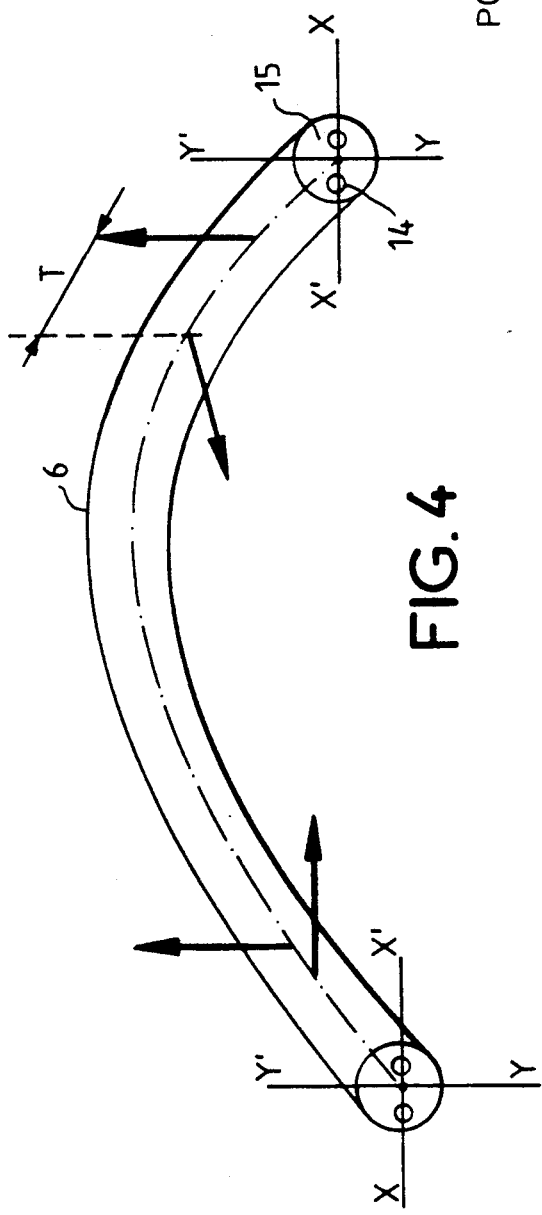
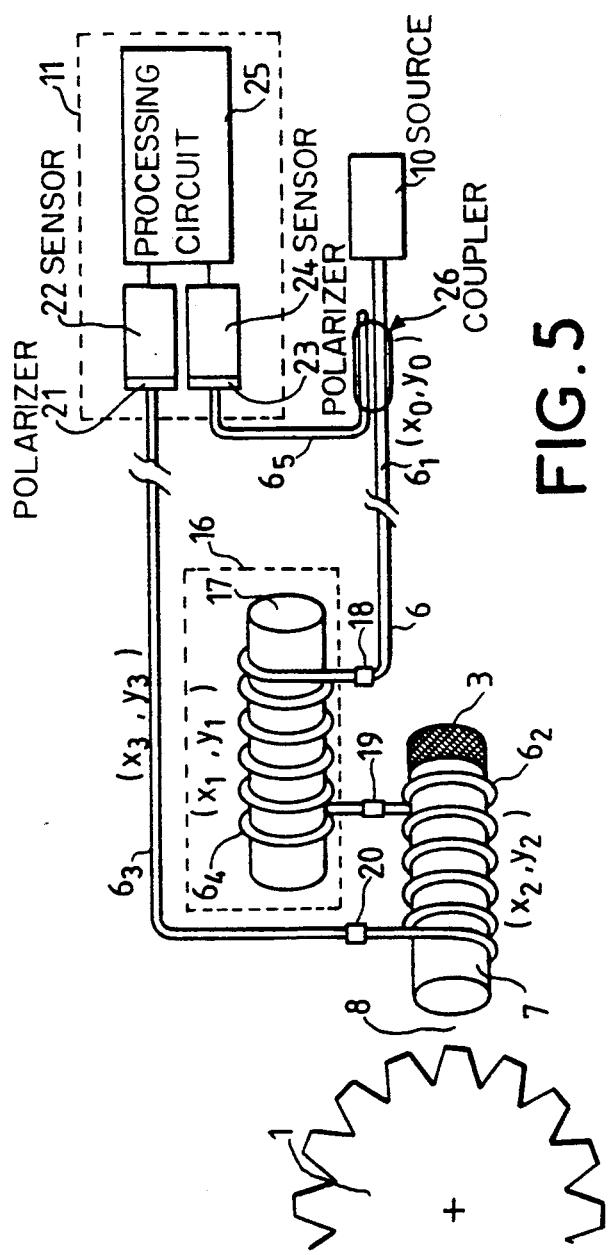
FIG. 4
FIG. 5

DEVICE FOR MEASURING ROTATIONAL SPEED USING AN OPTICAL FIBER SENSOR

BACKGROUND OF THE INVENTION

1. Field of the Invention

The invention relates to the field of sensors designed to measure the speeds of turboengine shafts and turbojet shafts.

2. Description of the Prior Art

At the present time, the speed of turboengine or turbojet shafts is checked by standard electromechanical devices that are known as "phonic wheels" which can be likened to homopolar generators.

The drawing of a device such as this is shown in FIG. 1.

These homopolar generators are formed by (see FIG. 1):
- a rotating part formed by a magnetic steel wheel with Z teeth, rotationally linked to the shaft to be checked (not shown);
- fixed part constituted by a coil with magnetic core 2, to which there is coaxially bonded a magnet 3.

The assembly is positioned in such a way that the passage of the teeth creates flux variations in the gap 4, the result of which is a voltage induced at the terminals of the coil.

The frequency of the signal 5 collected is equal to:

$$f = N \times \frac{Z}{60} \text{ (Hz)}$$

where N is the speed of rotation of the shaft in rpm. Its amplitude is an increasing function of the speed of rotation.

The sturdiness of this type of sensor enables it to stand up to the severe environmental constraints (vibrations, temperature and pollution) to which turbomachines are subjected. However, such sensors have certain limitations, for example:
- it is difficult to make measurements at low speed: the analog signal is then a low amplitude signal and it can be below the level of the ambient electromagnetic noise;
- the sensor has high sensitivity to induced or conducted electromagnetic parasites;
- it has low resistance to lightning.

The sensor according to the invention is aimed at overcoming these limitations while at the same time preserving the qualities of the electromagnetic sensor.

Another aim of the invention is to provide these advantages in such a way that existing sensors can easily be replaced.

SUMMARY OF THE INVENTION

To these ends, an object of the invention is a device designed to measure the rotational speed of a shaft of the type having a toothed wheel that is rotationally driven by the shaft, a magnet being placed in the vicinity of the toothed wheel, wherein said device has an optic fiber with two ends and a central part; one of the ends is connected to a light source, the other end is connected to light analysis means, and the central part has at least one part located in the magnetic field produced by the magnet and is subjected, in this part, to stresses generated by a magnetostrictive material.

BRIEF DESCRIPTION OF THE DRAWINGS

The general embodiment and two preferred embodiments of the invention shall be described hereinafter with reference to the appended drawings, wherein:

FIG. 4 illustrates the mode of variation of

FIG. 5 illustrates a first embodiment;

DETAILED DESCRIPTION OF THE INVENTION

Figure 1:
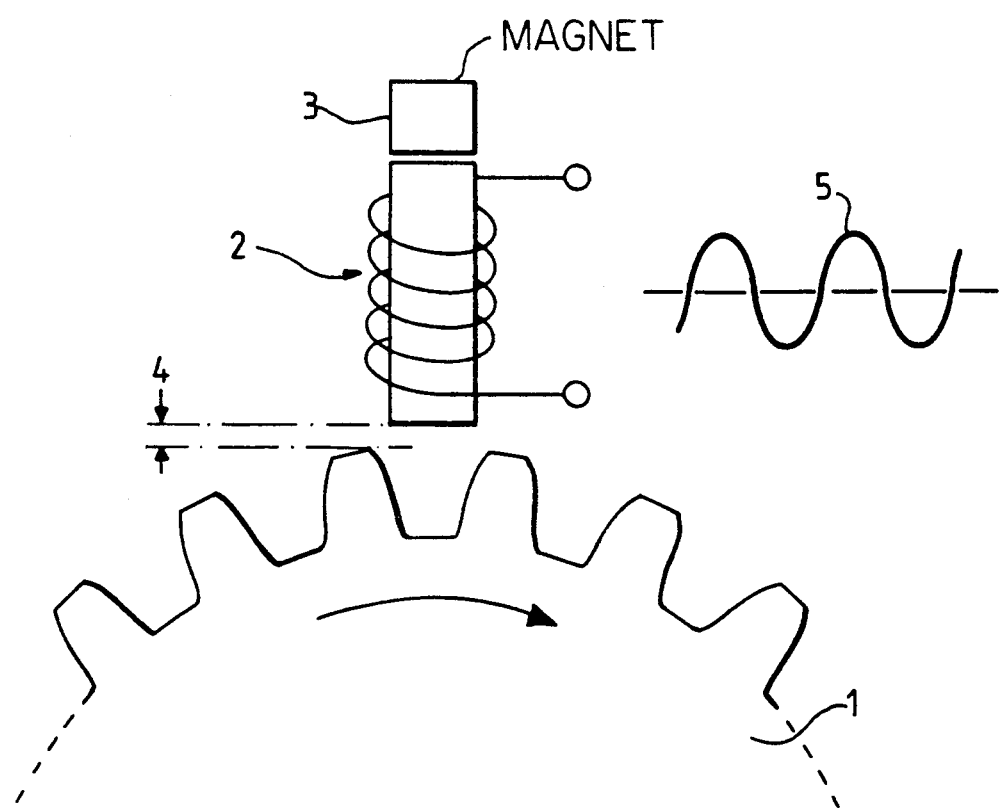
FIG. 1 shows the prior art speed sensor.
Figure 2:
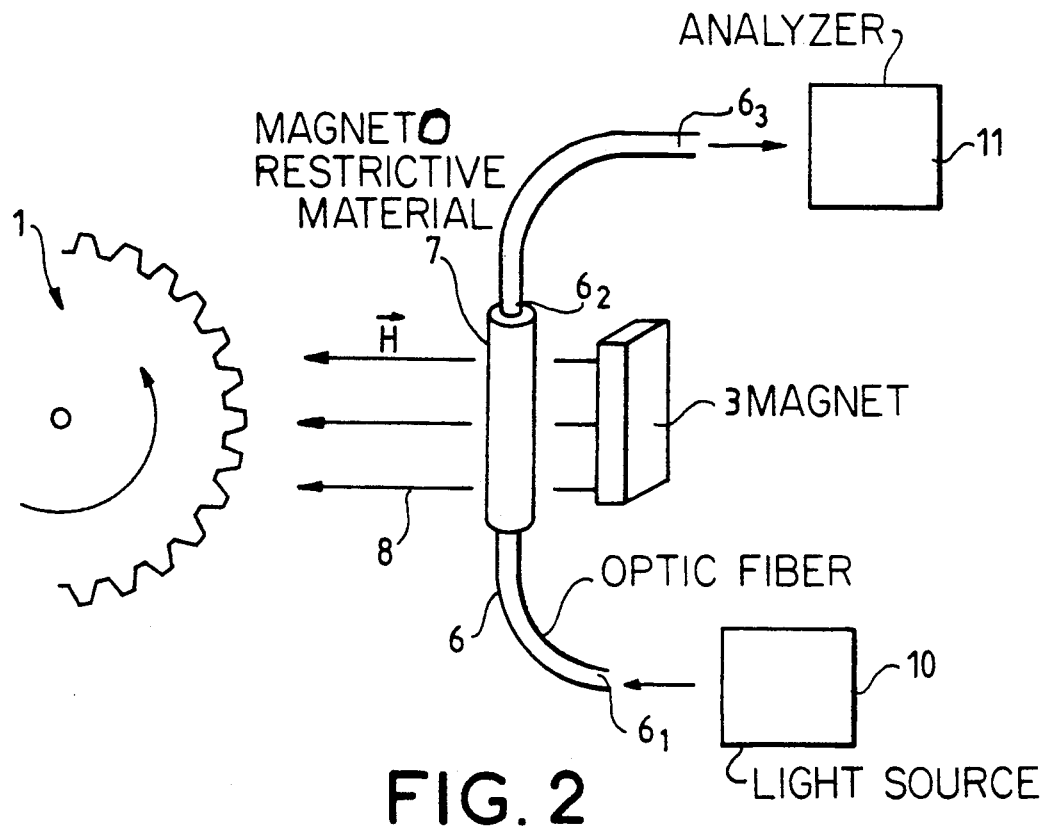
FIG. 2 shows the general embodiment of the invention.

FIG. 2 shows the general embodiment of the invention. It represents a toothed wheel 1. This wheel is linked in a known way to a shaft (not shown) whose speed is to be measured. The wheel 1 is located in the magnetic field 8 produced by a magnet 3. An optic fiber 6, linked by an end 6-1 to a light source 10, has a central part 6-2 in the magnetic field 8. The end part 6-3 of this fiber is connected to a light analyzer 11. In its central part 6-2, the fiber is subjected to stresses generated by variations in dimension prompted on a magnetostrictive material 7 by the variations in the magnetic field 8. These strains prompt variations in dimension in the central part 6-2 of the fiber. These variations in dimension, in their turn, prompt variations in certain parameters of propagation of the light emitted by the source 10. These variations are measured by the analyzer 11 and make it possible to determine the speed of the wheel 1.

It is seen, from this description, that the arrangement remains identical to that of the fiber with a phonic wheel in such a way that the sensors according to the invention can easily replace existing sensors.

Owing to the use of an optic fiber as a sensor instead of a conductive coil, the device is almost insensitive to lightning and, in general, it is insensitive to all electromagnetic parasites.

Thus, an electrically insulated sensor is made in a natural way.

Finally, for reasons that shall be explained further below, the device remains sensitive to low speeds, unlike in the case of tachometrical generator or homopolar generator type devices which should be optimized for a range of speed. Consequently, the use of the device according to the invention may lead to a reduction of the number of sensors needed, especially when it is sought to measure the rotational speeds of shafts having transitory phases (for example 0 rpm at a nominal speed) which is to be checked (when starting up jet engines, braking wheels etc.)

The sensor, according to the invention, is called intrinsic in that it is the sensor itself that acts as a sensitive element. An intrinsic sensor avoids any optical path in the air and is therefore insensitive to the modifications induced by pollution of all kinds, which is often present in an aeronautical environment.

The optic fiber is preferably a birefringent fiber.

The stress of the magnetostrictive material on the fiber is preferably exerted by the fact that the fiber is wound under tension on a bobbin made of the material.

It can also be exerted by the fact that the fiber is sheathed with magnetostrictive material, the fiber thus sheathed being wound on a bobbin.

It can also be exerted by the combination of the two above modes, namely with the fiber sheathed with magnetostrictive material being wound on a magnetostrictive bobbin.

The magnetostrictive material could be a glass metal, nickel, alloy of 40% at Co-Fe, an iron oxide or any other magnetostrictive material.

Two special embodiments shall now be described with reference to FIGS. 3 to 8. The elements described in any one of the embodiments do not necessarily exclude those described in the other embodiment.

Figure 3:
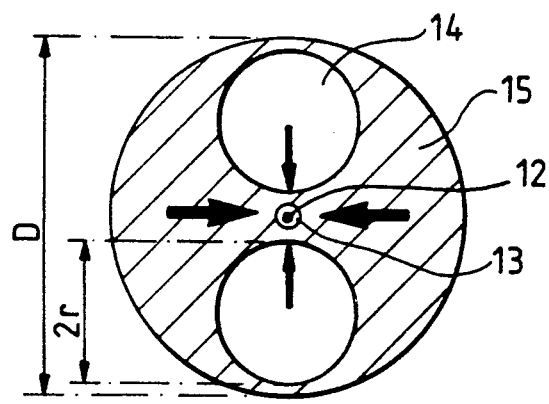
FIG. 3 shows a cross-section of the type of optic fiber used each of the two embodiments.

In these two embodiments, the optic fiber used is a polarization-maintaining birefringent monomode fiber sensitive to external mechanical stresses. For example, the fiber may be a channelled structure as can be seen in FIG. 3. The arrows express the anisotropy with which a uniform external stress is transmitted towards the core. It is this anisotropy that prompts the modification of the birefringence of the fiber (called $\beta$).

FIG. 3, which gives a sectional view of the fiber used, shows the core 12 of the fiber represented in a standard way by a dot. It is the part in which the light circulates. The part 13 represents the optical sheath. The diameter of the part 13 is of the order of some microns. This part 13 is embedded in a sheath 15 comprising two channels 14 which are circular-sectioned in this fiber. The centers of the channels 14 are aligned with the core 12 of the fiber. The heterogeneity introduced by these channels leads to an anisotropy of the stresses exerted on the fiber, the greatest stresses being transmitted perpendicularly to the line between the centers of the channels 14. The total diameter D of the fiber is of the order of 125 $\mu$m.

This fiber, which is used for the needs of the invention, does not form part of the invention. Its embodiment is described in the patent No. FR 89.15872.

For a proper understanding of the invention, it is recalled, however, that a birefringent fiber is a fiber in which light can propagate only in two orthogonal directions, referenced XX' and YY', to which there correspond two propagation constants $\beta x$ and $\beta y$.

$$\beta x = \frac{2\pi}{\lambda} n_x \text{ and } \beta y = \frac{2\pi}{\lambda} n_y$$

$\lambda$ is the wavelength and $n_x$ and $n_y$ are the respective indices in both directions. If $n_x$ and $n_y$ are different, the two waves are propagated at different speeds. If the fiber has a length L, the total phase shift between the two waves is:

$\Phi = (\beta x - \beta y) L$
with $\beta = \beta x - \beta y$
$\Phi = \beta L$ If a system of stresses is now applied to the fiber, the latter will undergo elastic deformations: the modification of the length ($\Delta L$) and the modification of the section causing, as stated, a modification of the birefringence ($\Delta \beta$). The result thereof, initially, is:

$\Delta \Phi = \beta \Phi L + L \Phi \beta$

If the phenomenon applied to the fiber is periodic, there appears a periodic variation of the phase shift $\Delta \Phi$. By measuring this phase shift, the period is deduced and, consequently, the speed of rotation is deduced in taking account of the number of teeth Z.

These modes of propagation are shown in FIG. 4. The axis XX' corresponds to the axis joining the centers of the channels 14. The axis YY' is perpendicular to it. The vectors represent the directions of the modes of propagation. T is the delay between the two waves.

Figure 6:
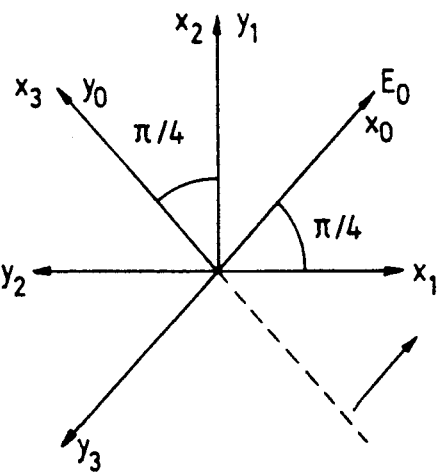
FIG. 6 shows the axes of polarization.

A description shall be given here below, with reference to FIGS. 5 and 6, of a first embodiment of the invention, called a polarimetrical mode. This is because in this mode, the phase shifts are measured by the periodic variation of the light intensity received on a photodetector through a polarizer filtering light along one of the directions XX' or YY'.

FIG. 5 shows the light source 10 that emits a light linearly polarized along a direction E. This source is coupled to a fiber 6 that is highly birefringent, along a birefringence axis of the fiber: this maintains its state of polarization up to an analyzer 11. In addition to the elements already mentioned to describe the general embodiment, the exemplary embodiment shown in FIG. 5 has a temperature compensation device 16. This device has the effect of compensating for the stresses introduced by the expansion forces. The magnetostrictive materials have variations in dimension, due to the magnetic fields, that are of the same magnitude as those due to the variations in temperature. Owing to the slowness of the temperature variations, it is possible to do without the compensation device 16. However, this compensation is necessary for greater precision, especially at the low speeds.

The magnetostrictive material 7 which has to produce stresses in the part 6-2 of the fiber 6 has the shape of a bobbin on which the fiber 6-2 is wound under tension. The compensator device 16 is constituted by an identical bobbin 17, on which there is wound, in an identical way, a part 6-4 of the optic fiber 6 having the same length as the part 6-2. The connection couplings 18, 19, 20 between the parts 6-1, 6-2, 6-3, 6-4 of the fiber 6 are explained here below with reference to FIG. 6.

This figure shows the axes xo yo (corresponding to the axes XX' and YY' of FIG. 4) of the fiber part 6-1. The vector Eo oriented along xo shows the polarization of the light source 10. The coupling 18 of this wave at 45° to the birefringence axes x1 and y1 of the compensation fiber 6-4 makes it possible to excite the two propagation axes of this fiber part. The compensation bobbin 17 is identical to the measuring bobbin of magnetostrictive material 7, but is not subjected to the variations of the magnetic field $\beta$.

The coupling 19 of the compensation fiber part 6-4 on the measuring fiber part 6-2 is done at 90° to the birefringence axes to transpose the slow and fast axes (x2 aligned with y1 and y2 aligned with x1) of the fiber parts 6-2 and 6-4 and thus compensate for the effects of stresses common to both fibers due to the temperature variations.

The light wave is then formed again and offset by means of a last birefringent fiber part 6-3 with axes x3 and y3, the coupling 20 of which is at 45° to the measuring fiber.

The operation is as follows:
The light wave emitted by the source 10 polarized along Eo also excites the axes x1 and y1 of the compensation fiber 6-4. The delay provided, for example on the axis x1 in the part 6-4, will be compensated for by an advance in the fiber 6-2 since the axis x2 of the fiber 6-2 is oriented by 90° to the axis X1 of the fiber 6-4. The coupling at 45° of the fiber part 6-3 with respect to the fiber part 6-2, repositions the fiber part 6-3 in the same arrangement as the part 6-1 with respect to the wave Eo. As explained further above, the passage of the teeth of the wheel 1 will prompt a periodic phase shift of the light wave at the output of the fiber part 6-2, which will be expressed by a flux of variable intensity in the analyzer 11.

The working of this analyzer 11 shall now be described.

It has a polarizer 21 receiving the light that comes from the fiber part 6-3 and is polarized in parallel to Eo. The light received through the polarizer 21 is received on a photodetector 22, the signal of which is processed by processing circuits 25. These circuits may supply display devices and/or inputs of a rotation speed regulating device not shown.

It is seen that a device of this type has little sensitivity to the mean value of the intensity since it measures the frequency of the variations in the intensity received at the detector 22. The processing circuits 25 count the cancellations of the derivative of the signal received. For this reason, the device still keeps its sensitivity at the low speeds. However, it is possible to improve this sensitivity notably at the low speeds by an ancillary device enabling a direct comparison of the light emitted with the light received. To this end, the source 10 is connected to a sensor 24 by means of a coupler 26, a fiber 6-5 having the same nature as the fiber used as a sensor and a polarizer 23. The signal processing device includes, in this case, a comparator device. The regulation thus introduced makes it possible to get rid of possible fluctuations of the source.

A second embodiment, called an interferometrical embodiment, shall now be described with reference to FIG. 7. This mode differs from the previous one on three points.

1) The source 10 used is a light source with low coherence: on the measuring fiber, there are obtained two decorrelated wave trains that are propagated on the two axes of polarization of the fiber.
2) The signal processing at output of the fiber 6-3 is done by means of an interferometrical type device.
3) The temperature compensation device 16 is constituted by a bobbin 17 made of a non-magnetostrictive material, that is concentric with the bobbin made of magnetostrictive material 7. This device is designed to improve the compactness of the measuring device. In this configuration, the bobbin 17 is made of a material that is insensitive to the magnetic fields but has an expansion coefficient, in the range of temperature at which the sensor will work, that is as close as possible to that of the bobbin of magnetostrictive material 7. The length 6-4 of the fiber part wound around the bobbin 17 is equal to the length 6-2 of the fiber part wound around the bobbin magnetostrictive material 7. The couplings 18, 19 and 20 are made in the same way as in the device described above.

The working of this second embodiment is as follows.

The two wave trains at the output of the fiber 6-3, along the axes x3 and y3, are sent to both the arms 28, 29 of a Mach Zehnder type interferometer 27. An electro-optical modulator 30 is controlled so as to place the two waves in phase: this results in a maximum of intensity on a photoelectrical sensor 22. As in the previous device, the signal produced by this detector is supplied to displays and/or regulator inputs by means of a processing circuit 25. In this case, a part of the signal at output of the circuit 25 is used as a feedback signal on the electro-optical modulator 30. The regulation thus introduced is designed to maintain the maximum intensity on the sensor 22. As in the above case, the source 10 may be connected to the signal processing circuit 25 by means of a coupler 26, a fiber 6-5 and a sensor 24 so as to enable fluctuations of the source, if any, to be taken into account.

The above device would work equally well with a set of bobbins 7-17 made as described in FIG. 5.

Figure 7:
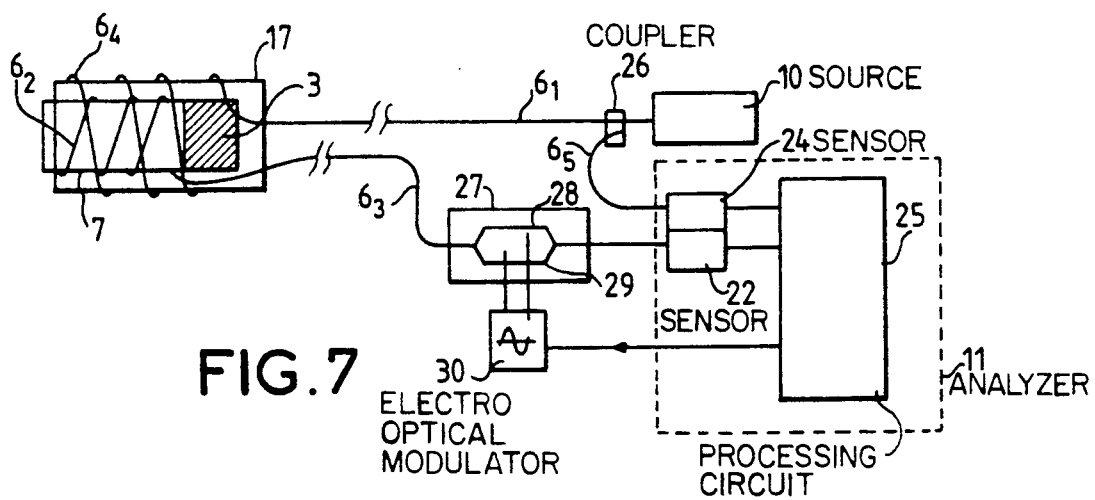
FIG. 7 illustrates a second embodiment.

In the same way, the device described in FIG. 5 could work with bobbins 7-17 as described in FIG. 7.

The devices of FIGS. 5 and 7 have been shown with a temperature compensation device 16 placed upline of the measuring device proper with respect to the light source 10. It is clear that with the necessary adaptations, notably as regards the fiber couplings 18, 19, 20, this device could equally well be placed downline.

In the same way, whatever may be the type of signal processing at output of the optic fiber part 6-3, the stress of the magnetic material on the optic fiber part 6-2 may be done either as indicated in these two examples or by the sheathing of the fiber in a magnetostrictive material, the fiber thus sheathed being wound under tension on a bobbin that may or may not be made of a magnetostrictive material.

Figure 8:
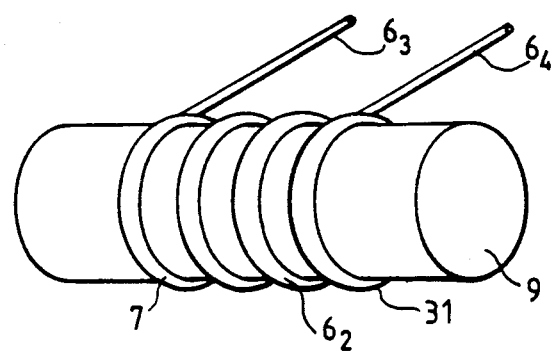
FIG. 8 illustrates an embodiment of the sensor coil.

An example of a winding such as this is shown in FIG. 8. This figure shows a bobbin 9 on which there is wound a part of the fiber 6-2 sheathed in a magnetostrictive material 31.

What is claimed is:

1. A device for measuring the rotational speed of a shaft coupled to a toothed wheel that is rotationally driven by the shaft comprising: a magnet being placed in the vicinity of the toothed wheel, an optic fiber having two ends and a central portion, one of the ends being connected to a light source, the other end being connected to light analysis means, the central portion being supported by a magnetostrictive material located in a magnetic field produced by the magnet said optic fiber being subjected to stresses generated by a said magnetostrictive material in response to said magnetic field.

2. A device according to claim 1, wherein the optic fiber is a birefringent fiber.

3. A device according to claim 2, wherein the optic fiber is a fiber embedded in a sheath having two diametrically opposite channels on either side of the fiber.

4. A device according to claim 3, wherein the fiber is wound under tension on a bobbin made of the magnetostrictive material.

5. A device according to claim 3, wherein the fiber is sheathed in a sheath made of said magnetostrictive material wound on a bobbin.

6. A device according to claim 5, wherein the bobbin is magnetostrictive.

7. A device according to claim 4, including a temperature compensation means for compensating for changes in said optic fiber properties which result from changes in temperature.

8. A device according to claim 7, wherein the temperature compensation means includes a second bobbin identical to the bobbin on which is wound a length of fiber equal to the length of fiber wound of the first bobbin.

9. A device according to claim 7, wherein the temperature compensation means includes a second bobbin made of material insensitive to the magnetic fields, that is concentric to the bobbin and on which there is wound, under the same tension, a length of fiber equal to the length of fiber wound on the first bobbin.

10. A device according to claim 8, wherein the light source emits a light that is linearly polarized along a birefringence axis of the fiber part to which the source is coupled.

11. A device according to claim 9, wherein the light source emits a light that is linearly polarized along a birefringence axis of the fiber part to which the source is coupled.

12. A device according to claim 10, wherein the coupling between the fiber part connected to the source and the fiber part of the compensation means, the coupling between compensation means and the fiber part wound on the bobbin, the coupling between the fiber part wound on the bobbin and the fiber part connected to the analyzer, are made, respectively, so that the birefringence axes of the different couplings form angles of 45°, 90° and 45°, respectively, with one another.

13. A device according to claim 11, wherein the coupling between the fiber part connected to the source and the fiber part of the compensation device, the coupling between this latter part and the fiber part wound on the bobbin, the coupling between this latter part and the fiber part connected to the analyzer, are made respectively in such a way that the birefringence axis of the different fiber parts form angles of 45°, 90°and 45° respectively with one another.

14. A device according to claim 12, wherein the light analyzing means include a polarizer oriented along one of the birefringence axes of the fiber part, a photometrical detector and a signal processing circuit.

15. A device according to claim 13, wherein the light analyzing means includes a polarizer oriented along one of the birefringence axes of the fiber part, a photometrical detector and a signal processing circuit.

16. A device according to claim 8, wherein the light source emits a light of low coherence that splits in the fiber into two wave trains, and wherein the analysis means includes an integrated optical circuit receiving the two wave trains from the fiber and providing the two wave trains on each of the two arms of a Mach Zehnder interferometer, and an electrooptical modulator controlled by a signal processing circuit connected to the interferometer to place the two wave trains in phase.

17. A device according to claim 9, wherein the light source emits a light of low coherence that splits up, in the fiber, into two wave trains and wherein the analysis means include an integrated optical circuit receiving the signals from the fiber and provides the two waves on each of two arms of a Mach Zehnder interferometer, and an electrooptical modulator controlled by a signal processing circuit connected to the interferometer to place the two wave trains in phase.

18. A device according to claim 14, wherein the light source and the means of analysis are furthermore connected by an optic fiber providing a signal from said light source to a photodetector of said analysis means by means of a linear polarizer.

19. A device according to claim 15, wherein the light source and the means of analysis are furthermore connected by an optic fiber, said optic fiber providing a signal to a photodetector of said analysis means by means of a linear polarizer.

20. A device according to claim 16, wherein the light source and the analysis means are furthermore connected by a fiber providing a signal to a photodetector of said analysis means.

21. A device according to claim 17, wherein the light source and the analysis means are furthermore connected by a fiber for delivering a light signal to a photodetector of said analysis means.

22. A device for measuring the rotational speed of a shaft coupled to a toothed wheel which rotates within a magnetic field comprising:
   a light source;
   a birefringement optic fiber connected at one end to said light source extending through said magnetic field;
   a magnetostrictive material supported in contact with said optical fiber for producing stresses in said optical fiber in response to magnetic flux variations induced in said magnetic field by said toothed wheel; and
   means for analyzing connected to a remaining end of said optic fiber for measuring changes in phase of said light in response to changes in stress applied to said optic fiber.

23. The device of claim 22 further comprising a temperature compensation device connected in series with said optic fiber, said compensation device providing a change in phase in said optic fiber which cancels changes in phase due to temperature changes in said optic fiber.

24. The device of claim 22 wherein said magnetostrictive material comprises a bobbin supporting multiple turns of said optic fiber.

25. The device of claim 22 wherein said optic fiber is supported in a sheath made from magnetostrictive material.

26. The device of claim 22 wherein said means for analyzing receives a reference light beam from said light source.

* * * * *